E. HOLMES.

DERRICK TRUCK.

APPLICATION FILED DEC. 23, 1918.

Reissued Sept. 2, 1919.

14,720.

3 SHEETS—SHEET 1.

Witness

John Powers.

Inventor

Ernest Holmes

By James L. Norris

Attorney

E. HOLMES.

DERRICK TRUCK.

APPLICATION FILED DEC. 23, 1918.

Reissued Sept. 2, 1919.

14,720.

3 SHEETS—SHEET 2.

Witness

C. E. Kesler

John S. Powers.

Inventor

Ernest Holmes

By James L. Norris

Attorney

E. HOLMES.
DERRICK TRUCK.
APPLICATION FILED DEC. 23, 1918.
Reissued Sept. 2, 1919.
14,720.
3 SHEETS—SHEET 3.
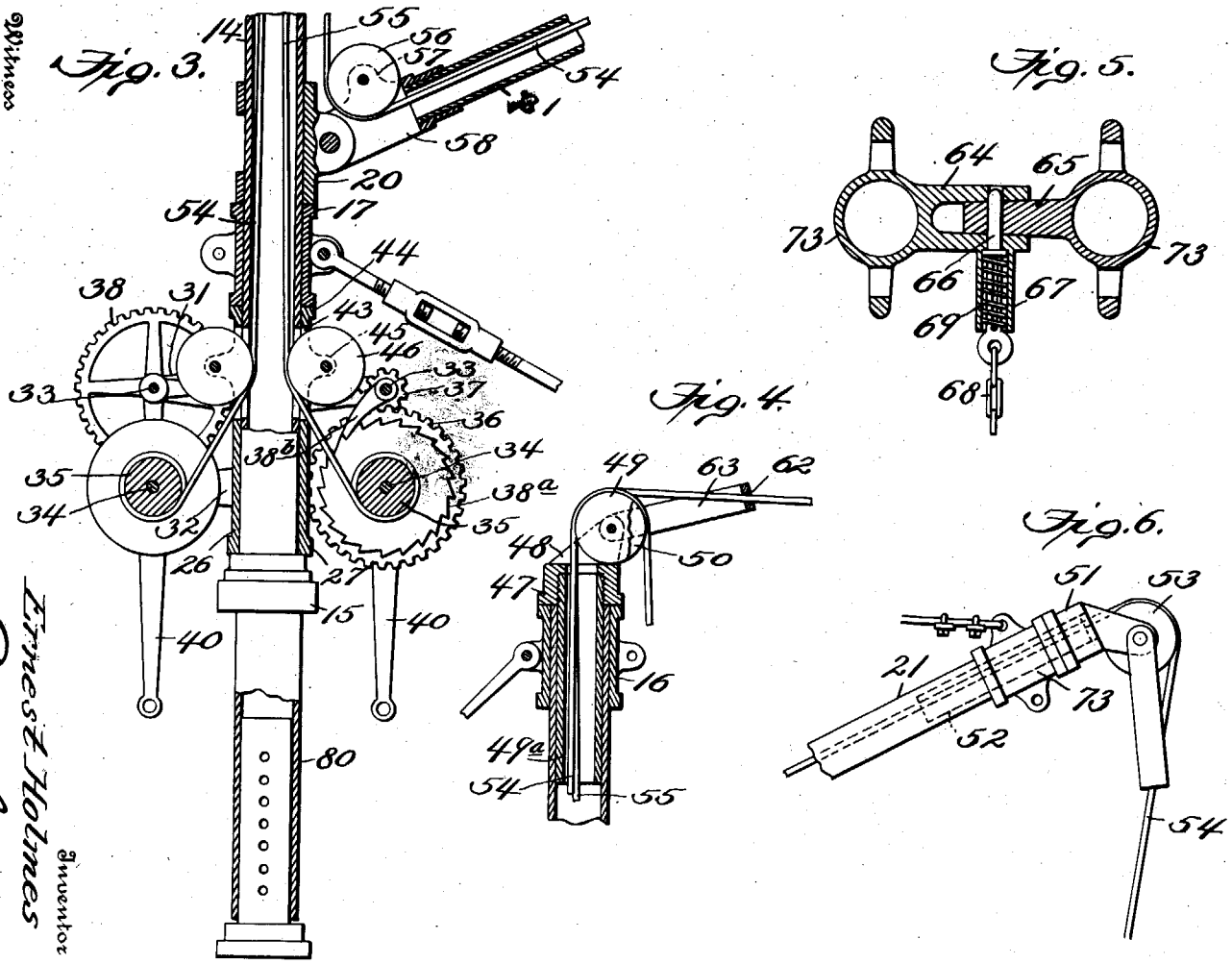
Witness
J. Lucas Powers
Inventor
Ernest Holmes
By James L. Norris
Attorney

UNITED STATES PATENT OFFICE.

ERNEST HOLMES, OF CHATTANOOGA, TENNESSEE.

DERRICK-TRUCK.

14,720. Specification of Reissued Letters Patent. Reissued Sept. 2, 1919.

Original No. 1,254,804, dated January 29, 1918, Serial No. 202,292, filed November 16, 1917. Application for reissue filed December 23, 1918. Serial No. 268,077.

*To all whom it may concern:*

Be it known that I, ERNEST HOLMES, a citizen of the United States, residing at Chattanooga, in the county of Hamilton and State of Tennessee, have invented new and useful Improvements in Derrick-Trucks, of which the following is a specification.

This invention relates to improvements in derrick trucks and its principal object is to provide an exceedingly strong and well-balanced structure which may be operated with marked facility and speed for the special purposes of extricating damaged or wrecked automobiles from the positions in which they may be left as the result of an accident and of hauling or towing such automobiles to a destination.

The invention consists in certain novel features of structure, relation and combination which will be set forth in detail as the description proceeds and which in general involve improvements in the derrick structure, improvements in the mutual relation or operative association of the booms, and improvements in the connections between the truck and the automobile in tow.

An embodiment of the invention is illustrated in the accompanying drawings, in which:—

Fig. 3 is a detail vertical sectional view of certain parts of the derrick structure at each side of the truck, more particularly an upright post and the cable actuating mechanisms for controlling and effecting the operations of each boom.

Fig. 4 is a detail vertical sectional view of the upper portion of the post shown in Fig. 3.

Fig. 5 is a detail cross-sectional view of a device by which the booms may be connected together.

Fig. 6 is a detail side elevation of the outer portion of a boom and certain parts in association therewith, the disclosure being applicable to both booms.

Similar characters of reference designate corresponding parts throughout the several views.

Figure 1:
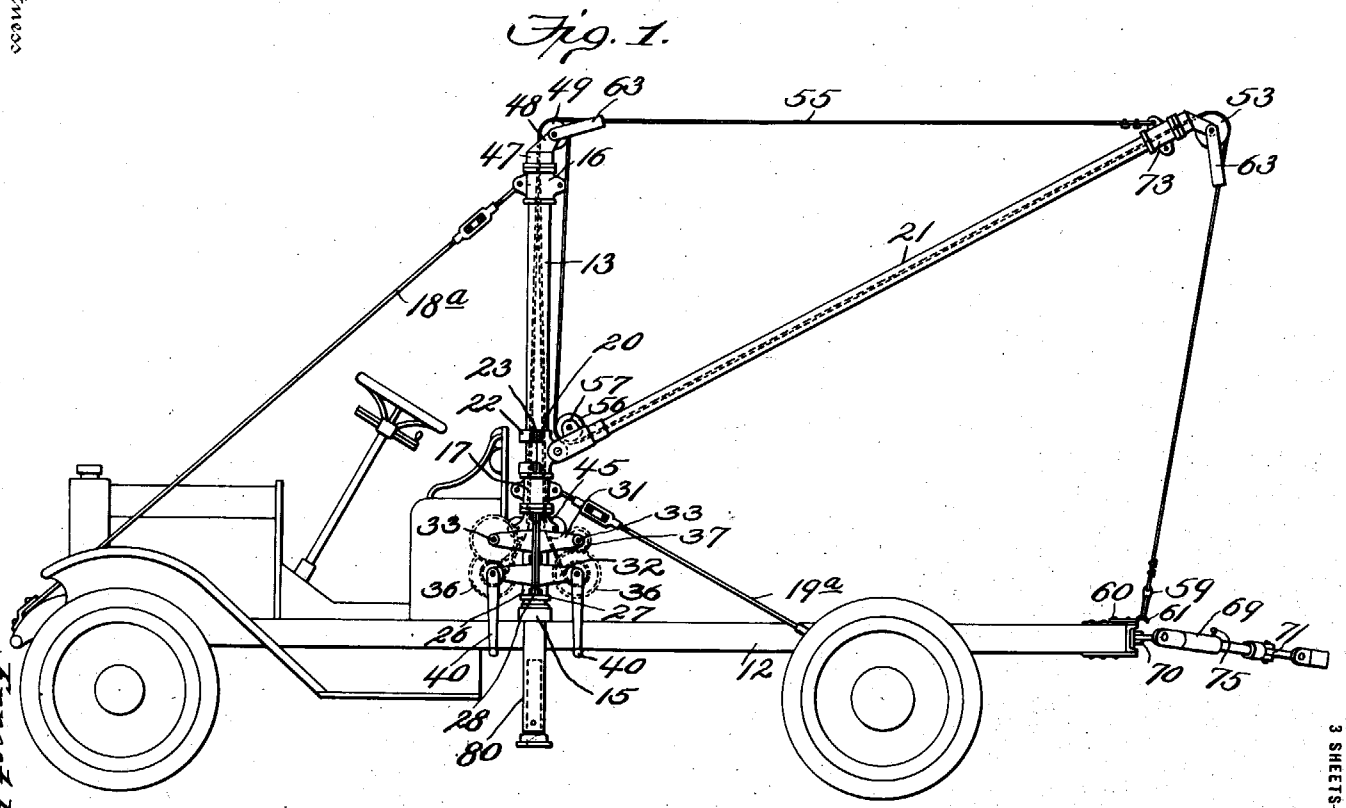
Figure 1 is a side elevation of an automobile truck in which the features of the invention are incorporated.
Figure 2:
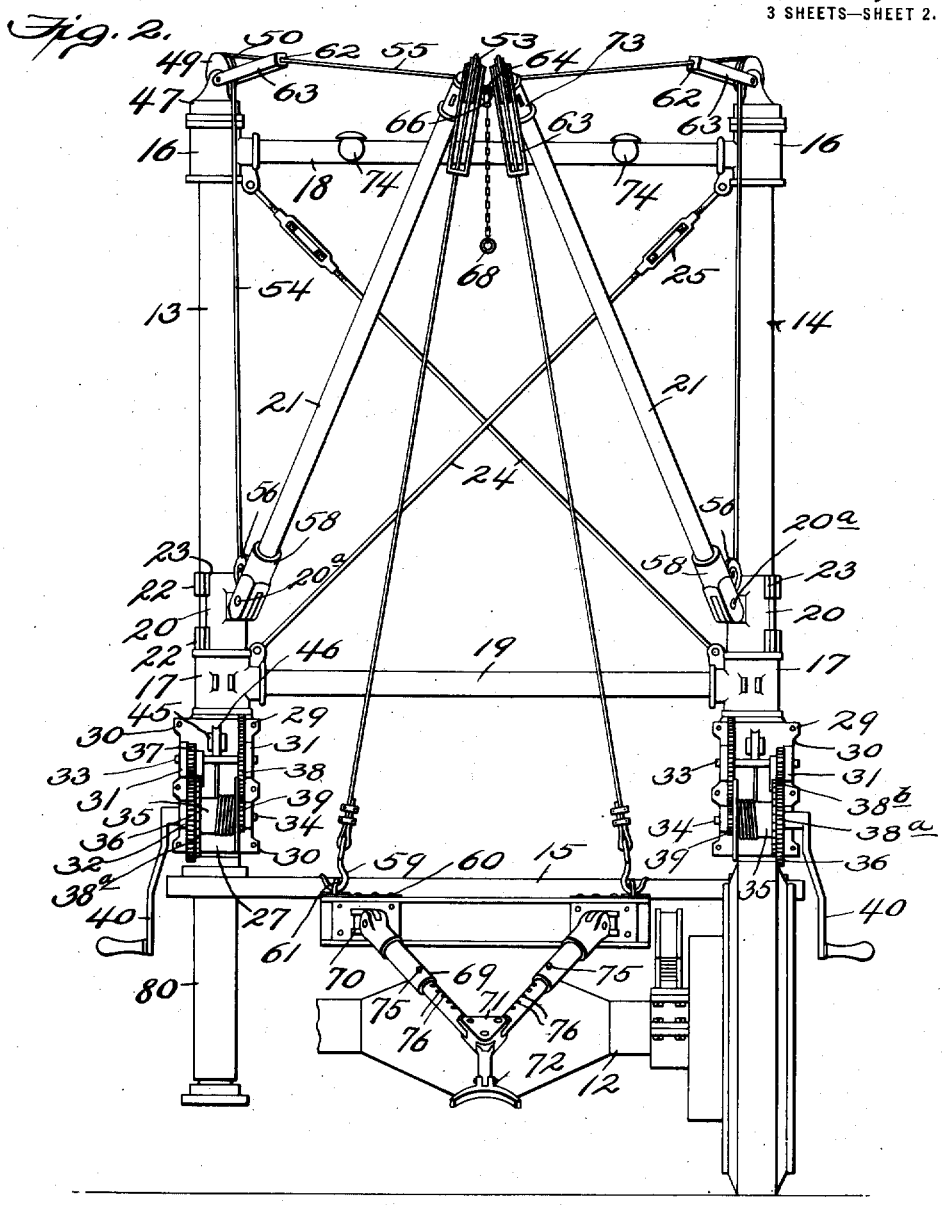
Fig. 2 is a rear elevation of the same.

The derrick structure is mounted upon a wheeled truck 12, preferably an automobile truck; and is preferably supported by a suitable cross beam 15 secured to the chassis. The framing of the derrick structure consists of suitably-braced upright posts 13 and 14 mounted on said beam adjacent the opposite sides of the truck. The posts 13 and 14 are preferably braced to one another by upper and lower cross-bars 18 and 19 and by intersecting diagonal struts or tie rods 24 which, for the purposes of adjustment and tensioning, may be made in sections connected by turn buckles 25. The posts 13 and 14 are also preferably braced to the chassis of the truck as by front struts or tie rods 18ª connected to said posts adjacent the upper cross-bar 18 and rear struts or tie rods 19ª connected to said posts adjacent the lower cross-bar 19. In the construction preferred, the posts are of cylindrical tubular form and their connection with the cross-bars 18 and 19 may be established by T-couplings 16 and 17, respectively, said couplings preferably having ears for the connection of the various struts or tie rods. The posts 13 and 14 and cross-bars 18 and 19 delimit a rectangular frame of great strength whose stability under the severe conditions of use is assured by the struts or tie rods arranged as described.

The derrick structure includes a pair of booms 21, one associated with each post; and each boom is mounted for pivotal movement about both vertical and horizontal axes. In the construction shown and preferred, the posts are utilized as the vertical pivotal centers of the booms, and for this purpose the booms are connected at their lower ends to brackets 20, rotatably fitted upon the respective posts and having their seating upon the couplings 17, said brackets being held on the posts by retaining clips 22 for the connection of which the brackets are provided with lugs 23. The connections between the booms 21 and brackets 20 include horizontal pivots 20ª about which said booms are movable independently of their movements about their vertical axes.

Each post and its associated boom 21 constitute elements of a derrick unit and the two units while susceptible of independent operation are also coöperating companions. Each unit includes a cable 55 for regulating and effecting the upward and downward movements of the boom and a lifting cable 54 for regulating the movements of the load. The cables 54 normally depend beyond the rear end of the truck, preferably by having the booms 21 from whose ends said cables are guided, of such length that they project beyond the rear end of the truck.

In the construction preferred, the post and boom of each unit are hollow and open-ended and are utilized as sheaths for the cables. Below the posts the cables are connected to suitable operating gearing to be hereafter described, and from such gearing both cables of each unit are led upward through the post which at its upper end carries a bracket 48 provided with cable-guide pulleys 49 and 50. The bracket 48 is mounted to turn co-axially about the post in order that it may participate in the swinging movement of the boom and for such purpose is preferably provided with a head 47 seating upon the upper end of the post and with a hollow gudgeon 49[a] extending from said head and journaled in the post. The cable 55 is trained over the pulley 50 and is suitably connected to the associated boom 21 whereby it may operate the same. As shown, the outer end of the cable 55 is connected to a clip or other suitable part 73 fitted upon the boom at or near its free end.

The cable 54 is trained over the pulley 49 and operates from the free end of the boom. Where, as preferred, the boom is used as a sheath for said cable, the latter is passed downward from the post, trained over a guide pulley 56 supported by the boom adjacent its attached end, passed through the boom, and then trained over a guide pulley 53 supported by the boom adjacent its free end. The boom is provided at its inner end with a sleeve 58 for its pivotal connection to the bracket 20 and the pulley 56 is conveniently mounted in ears 57 provided on said sleeve. It is desirable that the pulley 53 at the outer end of the boom should turn about the boom as a pivotal axis in order to compensate for the sway or drag of the load relatively to said boom; and for this purpose the bracket 51 which carries said pulley is preferably mounted similarly to the bracket 48, that is to say, it is provided with a head which seats upon the outer end of the boom and with a gudgeon 52 extending from said head and journaled in the boom.

The brackets 48 and 51 may carry suitable cable guides 63 whose office is to maintain the alinement of the cables 55 and 54 with the respective guide pulleys 50 and 53 and to insure that said brackets shall participate in the angular movements of said cables with reference to the post and the boom, respectively, as pivotal axes. As shown, the guides 63 are pivoted on the pintles or shafts of said pulleys and rest by gravity on the cables which they control.

The cables 54 are provided at their free ends with suitable attachment devices 59, for example hooks, which when the apparatus is not in use for loading or towing, may be engaged with eyes 61 provided in fixed plates 60, thereby to prevent the cables from swinging loosely from the booms.

Suitable mechanisms for the operation and control of the cables 54 and 55 is required, and an example of the structure and of a convenient arrangement of such mechanism is disclosed. As shown, the cable operating mechanism is provided in units each controlling one of the cables, and two of such operating units for the respective cables of each derrick unit are supported on each post by means of a collar which is arranged between the beam 15 and the couplings 17, said collar being composed of sections 26 and 27 which are clamped on the posts by fastenings 28 fitted through openings 29 in flanges 30.

Each cable operating unit consists of a drum 35 upon which the cable is wound or from which it is paid out and suitable gearing for the operation of said drum. The drum is loosely mounted upon a shaft 34 journaled in supporting arms 32 provided on the adjacent collar section and said shaft is the driving element of the gearing for the operation of the drum and may be provided with an operating crank 40. Such gearing also comprises a countershaft 33 supported above the shaft 34 by arms 31, a pinion 36 fast with the drum 35, a pinion 39 fast on the shaft 34, a pinion 38 fast on the shaft 33 and driven by the pinion 39 and a pinion 37 also fast on the shaft 33 and driving the pinion 36. Retrograde movement of the drum 33 is prevented by means of a ratchet wheel 38[a] secured to the pinion 36 and a pawl 38[b] pivoted on the shaft 33 for engagement with said ratchet wheel and displaceable normally from its engaging position to permit rotation of the drum and of the gear elements when the cable is to be paid out. Each of the collar sectons 26 and 27 has an opening 43 in the post and the cable passes into the post through said alining openings, being guided by a pulley 46 mounted in lugs 45 provided on the collar section. It is immaterial which of the cables is operated by a particular drum. As shown, the cable 54 is operated by the front drum and the cable 55 is operated by the rear drum.

An important feature of the invention which is carried out in the structure as above described is the arrangement of the co-operating booms in juxtaposition at opposite sides of the truck in conjunction with the mounting of said booms for both lateral and vertical swinging movement, whereby the booms may be positioned at any desired elevation and moved to project laterally beyond the sides of the truck or to project in the rearward direction, and beyond the rear end, of the truck. Such arrangement is of pronounced value in the associated operations of extricating a disabled automobile (which, for convenience, may be designated as "the load") from the position in which it may be left as the result of accident and of hauling or towing said automobile. In such work the truck is first brought to a favorable position and is preferably secured against movement by stabilizing jacks 80 which are preferably carried by and depend from the ends of the beam 15. The jacks 80 may be of any suitable construction for the purpose in view but they conveniently comprise telescopic sections, one of which for engagement with the ground is lengthwise adjustable relatively to the other whereby it may be normally supported at a suitable elevation above the ground or lowered to engage the ground and secured in its lowered position. The boom 21 at the side remote from the load upon being positioned at a suitable elevation, is then swung laterally outward until it projects at a right angle from the truck and the cable 54 associated with said boom is used as a guy by fastening its free end to a suitable anchorage, said cable and boom thus serving to prevent any tilting of the truck as an incident of the lifting and swinging of the load by the boom 21 and cable 24 at the opposite side of the truck. In this way a disabled automobile which has been left in an awkward or unfavorable situation, for example, an automobile which has been ditched at one side of the road or which has been overturned, may, with facility, be righted by the use of either of the booms and the associated cable 54. When the load is righted, it is worked gradually toward the rear of the truck by the active boom 21 and cable 54 and when it has reached a position wherein there is no liability of the truck tipping, the other boom, *i. e.* the one whose cable 54 was used as a guy, may be brought into action and by the use of both booms and their associated cables 54 the load may be quickly brought into position for towing, *i. e.*, a position in which it is squarely in the rear of and in alinement with the truck.

When the automobile has been positioned for towing the booms 21 occupy normal positions wherein they project in the rearward direction, and beyond the rear end, of the truck. In towing, it will be preferred in most cases to support that end of the damaged automobile which adjoins the derrick truck at a suitable elevation whereby said automobile will be supported by the wheels of its rearwardly-disposed truck and for such purpose the cables 54, which depend beyond the rear end of the derrick truck, are employed, said cables being connected to the automobile in tow by their hooks 59 or otherwise in any suitable manner. The invention includes means whereby the booms 21 cannot be swung laterally from their normal positions incident to the connection of the cables 54 to the load for the purpose of towing and in the preferred construction the said means is effective positively to hold said booms against lateral displacement from their normal positions and also positively to hold them at a determined elevation favorable to their use in towing. Said means may conveniently consist of a rigid coupling or connection between the booms and, as shown, utilizes the clips 73 and includes spaced apertured lugs 64 on one of said clips, a single apertured lug 65 on the other clip for engagement between the lugs 64 and a locking bolt 66 for engagement through the alining apertures of said lugs, said bolt being held engaged by a spring 69 housed in a sleeve 67 provided on one of the lugs 64. The coupling is obviously rendered inoperative by retracting the bolt 66 which for convenience has a pull chain or cord 68 attached to its outer end.

The vehicle in tow has a tendency to oscillate which, if not corrected, would put certain undesirable stresses and shocks upon the booms and derrick structure where, as described, the booms are connected to said vehicle by the cables 54 and are held against lateral displacement from their rearwardly projecting positions. With the object of avoiding such stresses and shocks, the invention includes means for substantially preventing any lateral oscillation of the vehicle in tow and such means may advantageously consist of a draft coupling adaptable to the elevation at which the front end of the towed vehicle may be supported and effective positively to maintain the alinement of said front end with the derrick truck. As shown, the draft coupling consists of rearwardly convergent arms 69 pivoted for vertical play to brackets 70 secured at the rear end of the truck. At their rear ends the arms 69 are connected to a centrally located head 71 which carries the rearwardly projecting coupling element 72, the coupling proper being of any suitable construction whereby the element 72 may be attached to the vehicle in tow. The arms 69 are preferably made in adjustable sections whereby their length may be varied as the exigencies of a particular situation may require. Accordingly, said arms are pivoted to the head 71. The adjustable sections of the arm 69 are preferably telescopic, one section having a lengthwise row of apertures 76 arranged at suitable intervals and the other section having a removable pin 75 for engagement in any one of said apertures. The coupling described, while substantially preventing lateral oscillation of the vehicle in tow, also holds said vehicle at a constant distance from the truck and prevents it from moving toward the truck under momentum or on a down grade.

The derrick frame may be provided with means of illumination, for example electric lamps 74 conveniently mounted on the cross bar 18.

The foregoing description is predicated upon an advantageous embodiment of the invention, as disclosed in the drawings, and in order that said embodiment may be readily understood I have explained at length all of its various structural details. It is to be understood, however, that the invention is not limited in its scope to minor structural details of the embodiment disclosed, but includes equivalent features of structure and arrangement adapted to the several objects and advantages stated and to any of the essential combinations and arrangements of structural elements into which the invention may be resolved, as severally specified in the following claims.

It is also to be understood that a derrick truck in which the features of the invention are incorporated may be used with facility in general operations of loading, transporting and unloading.

I claim:—

1. In an apparatus of the character described, in combination, a truck, a pair of juxtaposed booms mounted at opposite sides of the truck for lateral swinging movement, said booms being movable to project laterally beyond the truck and having normal positions in which they project rearward beyond the truck, lifting cables associated with the booms and guided from the ends thereof, said cables normally depending beyond the rear end of the truck and serving for the support of the front end of a vehicle in tow, and means for paying out or taking in said cables.

2. In an apparatus of the character described, in combination, a truck, a pair of juxtaposed booms mounted at opposite sides of the truck for lateral swinging movement, said booms being movable to project laterally beyond the truck and having normal positions in which they project in the rearward direction of the truck, lifting cables associated with the booms and guided from the ends thereof, said cables normally depending beyond the rear end of the truck and serving for the support of the front end of a vehicle in tow, means for paying out or taking in said cables, and means for preventing said cables as connected to the front end of the vehicle in tow from producing movements of said booms laterally from said normal positions.

3. In an apparatus of the character described, in combination, a truck, a pair of juxtaposed booms mounted at opposite sides of the truck for lateral swinging movement, said booms being movable to project laterally beyond the truck and having normal positions in which they project rearward beyond the truck, lifting cables associated with the booms and guided from the ends thereof, said cables serving for the support of the front end of a vehicle in tow, means for paying out or taking in said cables, and means for holding said booms in their said normal positions.

4. In an apparatus of the character described, in combination, a truck, a pair of juxtaposed booms mounted at opposite sides of the truck for lateral swinging movement and also mounted for vertical swinging movement, said booms being movable to project laterally beyond the truck and having normal positions in which they project rearward beyond the truck, lifting cables associated with the booms and guided from the ends thereof, said cables serving for the support of the front end of a vehicle in tow, means for paying out or taking in said cables and means for holding said booms in their normal positions and at a certain favorable elevation.

5. In an apparatus of the character described, in combination, a truck, a pair of juxtaposed booms mounted at opposite sides of the truck for lateral swinging movement, said booms being movable to project laterally beyond the truck and having normal positions in which they project rearward beyond the truck, lifting cables associated with the booms and guided from the ends thereof, said cables serving for the support of the front end of a vehicle in tow, means for paying out or taking in said cables and a detachable coupling between the booms for holding them in their said normal positions.

6. In an apparatus of the character described, in combination, a truck, a pair of juxtaposed booms mounted at opposite sides of the truck for lateral swinging movement and also mounted for vertical swinging movement, said booms being movable to project laterally beyond the truck and having normal positions in which they project rearward beyond the truck, lifting cables associated with the booms and guided from the ends thereof, said cables serving for the support of the vehicle in tow, means for paying out or taking in said cables, and a detachable coupling between the booms for holding them in their normal positions and at a certain favorable elevation.

7. In an apparatus of the character described, in combination, a truck, a pair of juxtaposed booms mounted at opposite sides of the truck for lateral swinging movement, lifting cables associated with the booms and guided from the ends thereof, means for paying out or taking in the cables, and means for holding the booms in positions in which they project in the rearward direction of the truck and are mutually coöperative for the support of the vehicle in tow.

8. In an apparatus of the character described, in combination, a truck, a pair of juxtaposed booms mounted at opposite sides of the truck for lateral swinging movement, lifting cables associated with the booms and guided from the ends thereof, said cables being available for the support of the front end of the vehicle in tow, means for paying out or taking in the cables, and means for holding the booms against displacement by the action of the cables as connected to the vehicle in tow from positions in which they project in the rearward direction of the truck.

9. In an apparatus of the character described, in combination, a truck, a pair of juxtaposed booms mounted at opposite sides of the truck for lateral swinging movement and also for vertical swinging movement, lifting cables associated with the booms and guided from the ends thereof, means for paying out or taking in the cables, and means for holding the booms against lateral and vertical displacement from positions in which they project in the rearward direction of the truck.

10. In an apparatus of the character described, in combination, a truck, a pair of juxtaposed booms mounted at opposite sides of the truck for lateral swinging movement, said booms being movable to project laterally beyond the truck and having normal positions in which they project in the rearward direction of the truck, lifting cables associated with the booms and guided from the ends thereof, said cables normally depending beyond the rear end of the truck and serving for the support of the vehicle in tow, means for paying out or taking in the cables and means for coupling the truck and the vehicle in tow and preventing oscillation of said vehicle as supported by said cables.

11. In an apparatus of the character described, in combination, a truck, a pair of juxtaposed booms mounted at opposite sides of the truck for lateral swinging movement, said booms being movable to project laterally beyond the truck and having normal positions in which they project in the rearward direction of the truck, lifting cables associated with the booms and depending from the ends thereof, said cables normally depending beyond the rear end of the truck and serving for the support of the vehicle in tow, means for paying out or taking in the cables, means for holding the booms against displacement by the action of the cables as connected to the vehicle in tow from positions in which they project in the rearward direction of the truck and means for coupling the truck and the vehicle in tow and preventing oscillation of said vehicle as supported by said cables.

12. In an apparatus of the character described, in combination, a truck, a pair of juxtaposed booms mounted at opposite sides of the truck for lateral swinging movement cables associated with the booms for the suspension of the end of a vehicle in tow, means for coupling the truck and the vehicle in tow whereby to prevent lateral oscillation of said vehicle as supported by said cables, the booms having positions in which they project in the rearward direction of the truck when said cables are connected to the vehicle in tow, and means for holding the booms against displacement from said positions.

13. In an apparatus of the character described, in combination, a truck, an upright post mounted on the truck, a boom, a bracket rotatably mounted on said post and to which said boom is pivoted, said post and boom forming a derrick unit, a cable for operating said boom about its pivot, a lifting cable, a bracket rotatable about the axis of said post at the upper end thereof and having pulleys for said cables, means for paying out or taking in said cables, the latter being led upward lengthwise of said post and trained over said pulleys, said boom operating cable being operatively connected to the outer end of said boom and extending directly between said boom and said post, a bracket rotatable about the axis of said boom at the outer end thereof and having a pulley for said lifting cable, and another pulley for said lifting cable mounted adjacent the lower end of said boom, said lifting cable being passed downward from the upper end of the post, trained over the pulley adjacent the lower end of the boom and thence led outward lengthwise of the boom and trained over the pulley at the outer end of the boom.

14. In an apparatus of the character described, in combination, a truck, an upright hollow post mounted on the truck, a hollow boom, a bracket mounted on said post and to which said boom is pivoted, said post and boom forming a derrick unit, a cable for operating said boom about its pivot, a lifting cable, a bracket fitted to the upper end of said post and having pulleys for said cables, said post providing a pivotal center about which said brackets are rotatable, means for paying out or taking in said cables the latter being led upward within said post and trained over said pulleys, said boom operating cable being operatively connected to the outer end of said boom and extending directly between said boom and said post, a bracket fitted to the outer end of said boom and having a pulley for said lifting cable, said boom providing a pivotal center about which said last-named bracket is rotatable, and another pulley for said lifting cable mounted adjacent the lower end of the boom, said lifting cable being passed downward from the upper end of the post, trained over the pulley adjacent the lower end of the boom, led outward within the boom and trained over the pulley at the outer end of the boom.

15. In an apparatus of the character described, in combination, a truck having cable means depending beyond its rear end for the support of a vehicle in tow, and boom means associated with said cable means in combination with means for coupling the truck and the vehicle in tow and preventing oscillation of said vehicle as supported by said cable means.

In testimony whereof I have hereunto set my hand in the presence of two subscribing witnesses.

ERNEST HOLMES.

Witnesses:
JOHN S. FLETCHER,
S. BARTON STRANG.